W. F. CONNOLLY.
GATE HINGE.
APPLICATION FILED JUNE 17, 1920.
1,437,722.
Patented Dec. 5, 1922.
2 SHEETS—SHEET 2.
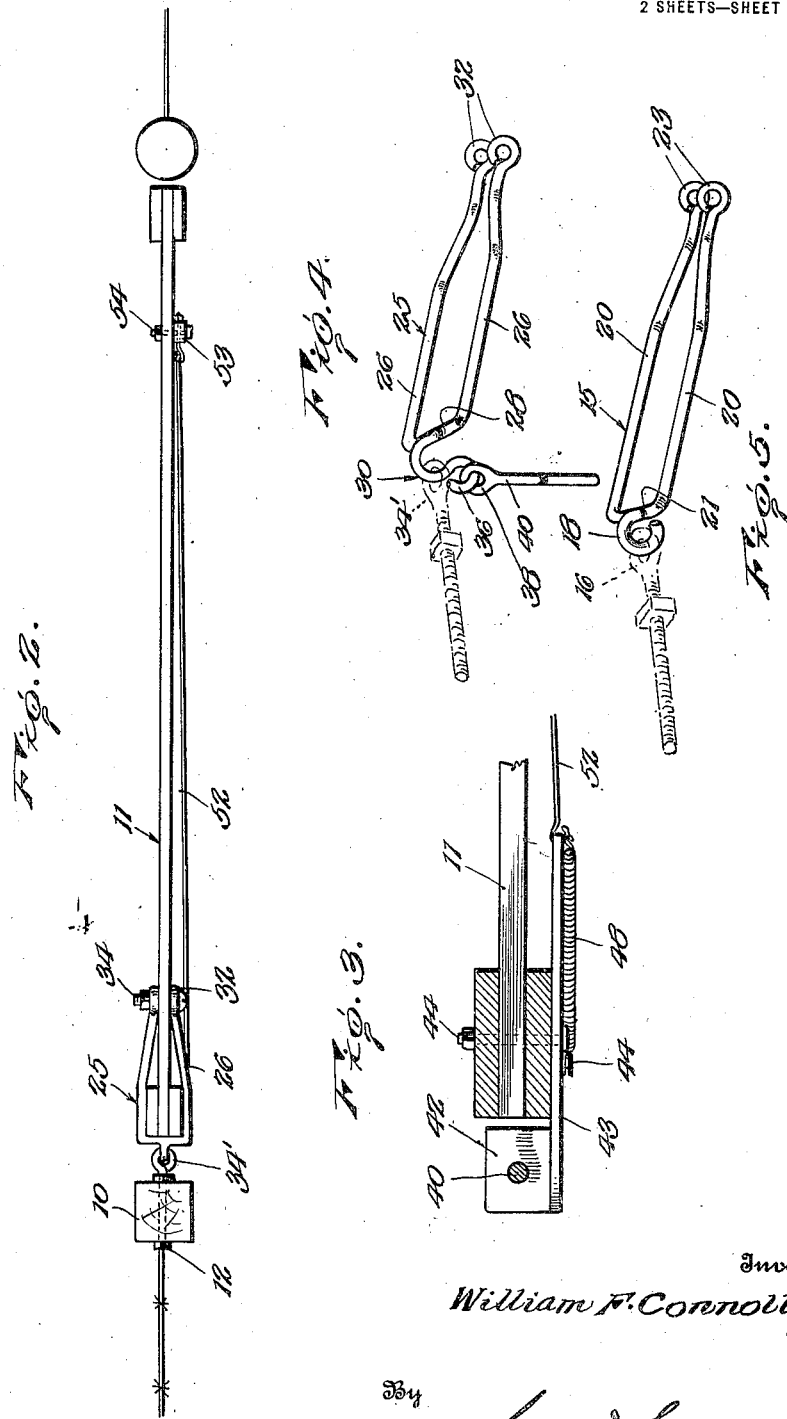
Inventor
William F. Connolly.
By Lacey & Lacey, Attorneys Patented Dec. 5, 1922.

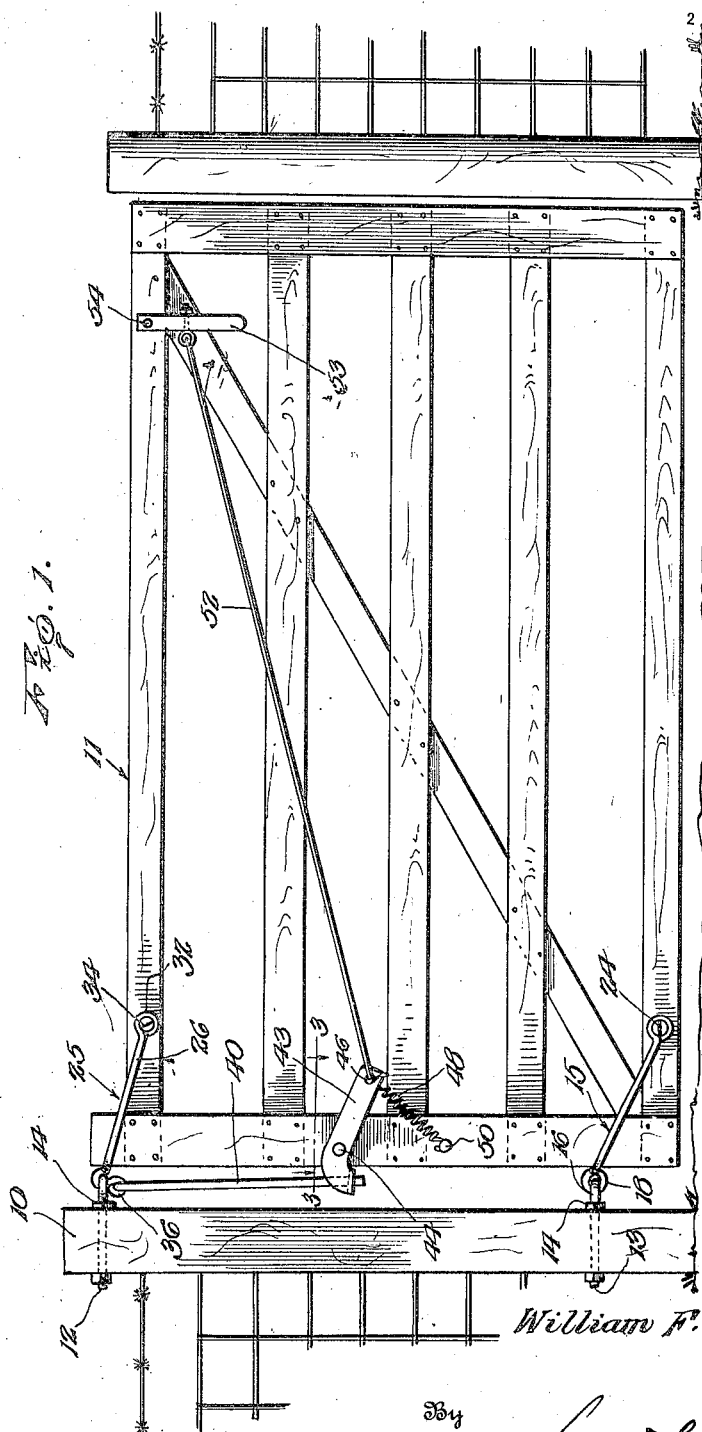

1,437,722

UNITED STATES PATENT OFFICE.

WILLIAM F. CONNOLLY, OF FARLEY, IOWA.

GATE HINGE.

Application filed June 17, 1920. Serial No. 389,657.

*To all whom it may concern:*

Be it known that I, WILLIAM F. CONNOLLY, a citizen of the United States, residing at Farley, in the county of Dubuque and State of Iowa, have invented certain new and useful Improvements in Gate Hinges, of which the following is a specification.

This invention relates to improvements in farm gates and more particularly to the supporting means therefor.

An important object of this invention is to provide a supporting means for farm gates having novel means whereby the gate may be securely adjusted the desired distance above the ground so as to clear snow and other obstructions in the path of travel of the gate.

A further object of the invention is to provide a hinge for gates which will prevent the gate from sagging and dragging upon the ground.

A further object of the invention is to provide a gate hinge having novel means for allowing the gate to be elevated preparatory to opening the same.

A further object of the invention is to provide a hinge for farm gates and the like which may be readily applied, which is durable in use and which may be manufactured at a low cost.

Other objects and advantages of the invention will be apparent during the course of the following description.

In the accompanying drawings forming a part of this application and in which like numerals are employed to designate like parts throughout the same.

Figure 1 is a side elevation of the improved hinge applied,

Figure 2 is a plan view of a farm gate having the improved hinge,

Figure 3 is a horizontal section taken on line 3—3 of Figure 1,

Figure 4 is a perspective view of one of the hangers forming a part of the hinge, Figure 5 is a perspective view of another hanger embodied in the invention.

In the drawings wherein for the purpose of illustration is shown a preferred embodiment of the invention, the numeral 10 generally designates a post or upright upon which a gate 11 is supported for swinging movement through the medium of the improved hinge. The improved hinge comprises upper and lower eye bolts 12 and 13 which are extended through the post 10 and are secured to the same by lock nuts 14. A hanger generally designated by the numeral 15 is connected to the lower eye bolt and is hingedly connected to the looped head 16 of the same through the medium of a loop or eye 18 at its rear end.

With particular reference to Figure 5, it will be observed that the hanger 15 is substantially U-shaped and comprises side arms 20 and a bight portion or connecting portion 21 to which the eye or loop 18 is connected. The forward or free end portions of the side arms 20 are offset inwardly and are formed with loops 23 which receive a bolt 24 which is extended through the lower portion of the gate.

Obviously, the arms are hinged on opposite sides of the gate and are securely though pivotally connected to the same through the medium of the bolt 24. When the gate is swung in either direction, the loop 18 partakes of a pivotal movement with relation to the loop 16.

A second hanger 25 adapted to be arranged above the lower hanger 15 is clearly illustrated in Figure 4 and like the hanger 15 is substantially U-shaped. The upper hanger 25 comprises a pair of arms 26 and a bight or connecting portion 28 to which a substantially S-shaped member 30 is connected. The forward or free end portions of the arms 26 are offset inwardly and are formed with loops 32 arranged on opposite sides of the gate and connected to the same through the medium of pivot bolts 34. The upper portion of the S-shaped member 30 is extended through the looped end 34' of the eye bolt 12 and is capable of a pivotal movement with relation to the loop 34' upon the opening of the gate. The lower portion of the S-shaped member 30 is in the form of an eye or loop 36 to which the looped head 38 of a locking rod 40 is connected.

The locking rod 40 is, as illustrated in Figure 1, suspended from the S-shaped member 30 and is extended through a laterally projecting ear 42 carried by one end portion of a locking arm 43. The locking arm 43 is horizontally pivoted to one side of the gate through the medium of a pivot pin 44 and has one end portion formed with an aperture 46 through which one end of a coil spring 48 is connected. The other end portion of the coil spring is connected to the rear portion of the gate through the medium of a fastening device 50 and the function of the coil spring is to draw the forward end portion of the locking arm 43 downwardly so that the laterally projecting apertured ear 42 will be brought into locking engagement with the locking rod 40. Of course, when the forward portion of the arm 43 is moved downwardly, the side walls of the opening in the apertured ear 42 will be rigidly engaged with the locking rod so as to bite into the same.

The gate is limited in its downward movement by contact of its rear end with the connecting or bight portions 21 and 28 and when in its downward position will partake of a free swinging movement.

The means employed for releasing the arm 43 from locking engagement with the depending rod 40 comprises a rod 52 having connection with a handle or operating lever 53 which as illustrated in Figure 1 is pivoted at its upper end portion to the forward portion of the gate by a pivot pin 54. By moving the lower or free end portion of the handle 53 in the direction of the free end portion of the gate, the laterally projecting apertured ear 42 of the locking arm 43 is moved at right angles to the depending rod 40 so that the gate may move either upwardly or downwardly.

In attaching a farm gate or the like to a post or other support through the medium of the improved hinge herein illustrated, the upper and lower eye bolts 12 and 13 are extended through and secured to the post in such a manner that the looped ends of the same are arranged in vertical alignment. The hangers 15 and 25 which have been previously connected to the rear portion of the gate are then connected to the looped heads of the bolts so that the gate may partake of a free swinging movement. Attention is invited to the fact that the position of the gate with relation to the ground may be adjusted by an adjustment of the upper or lower eye bolts. That is to say, the forward portion of the gate may be inclined upwardly to a slight degree by positioning the looped head 34' of the eye bolt rearwardly of the looped head 16 of the eye bolt 13. In this manner the gate may be adjusted to clear any permanent obstruction in the line of travel of the gate.

When it is desired to swing the gate to an open position to overcome an obstruction in the path of travel of the gate, it is merely necessary to manually elevate the gate sufficiently high to clear the obstruction. Upon being manually elevated, the locking arm of the gate securely grips the depending locking rod 40 so that the gate is not allowed to accidentally resume its lowermost position.

Upon returning the gate to a closed or partly closed position, the free end portion of the lever or handle 53 may be drawn in the direction of the forward or free end portion of the gate so as to move the locking arm on the pivot 44. The pivotal movement of the locking arm 43 releases the laterally projecting apertured ear 42 from locking engagement with the depending rod 40 so that the gate will immediately by force of gravity be returned to its lowermost position.

With reference to the foregoing description taken in connection with the accompanying drawing, it will be observed that a hinge constructed in accordance with this invention may be readily and conveniently applied to gates of various styles without the exercise of unusual skill or without the expenditure of much time.

In use the gate may be elevated to any desired extent within the limit of the locking rod 40 and the engagement of the bights 21 and 28 of the hangers with the inner end of the gate so as to clear snowdrifts or any other obstructions may be in the path of travel of the gate upon being opened.

It is to be understood that the form of the invention herewith shown and described is to be taken as a preferred embodiment of the invention and that such minor changes in construction and arrangement of parts may be made as will remain within the spirit of the invention and the scope of what is claimed.

Having thus described the invention, what is claimed as new is:

1. The combination with a gate, of yoke members pivotally connected with the gate and supporting the same for swinging movement, the gate being bodily movable in an upward direction upon the said members to various elevated positions, a rod pivotally suspended from one of said hinge members, a clutch member pivotally mounted upon the gate and coacting with the said rod to support the gate at various elevations, and means normally influencing movement of the clutch member to active position with relation to the rod.

2. The combination with a gate, of yoke members pivotally connected with the gate and supporting the same for swinging movement, the gate being bodily movable in an upward direction upon the said members to various elevated positions, a rod pivotally suspended from one of said hinge members, a clutch member pivotally mounted upon the gate and coacting with the said rod to support the gate at various elevations, means normally influencing movement of the clutch member to active position with relation to the rod, and means operable from the free side of the gate for moving the clutch member to inactive position.

3. The combination with a gate, of yoke members pivotally connected with the gate and supporting the same for swinging movement, the gate being bodily movable in an upward direction upon the said members, a rod suspended from one of the members, and means upon the gate for frictional engagement with the rod to support the gate at various elevations.

4. The combination with a gate and a fixed support, of eye members carried by the support, a yoke having spaced arms straddling the lower portion of the gate and pivotally connected therewith and a connecting portion having pivotal engagement with one of the eye members upon the fixed support, a yoke having a connecting portion and arms straddling the upper portion of the gate and pivotally connected therewith, the connecting portion of the yoke having a hook member extending therefrom and pivotally engaging another of the eye members upon the fixed support, the gate being supported for swinging movement by the said yokes and being bodily movable in an upward direction upon the yokes, a rod pivotally suspended from the hook portion of the connecting part of the second mentioned yoke, and means upon the gate frictionally coacting with the said rod to maintain the gate at various positions of elevation.

In testimony whereof I affix my signature.

WILLIAM F. CONNOLLY. [L. S.]